Patented Apr. 15, 1952

2,592,619

UNITED STATES PATENT OFFICE 2,592,619

O-ETHYL S-(ETHYLXANTHOYL) PIPERIDYL THIOPHOSPHATE

Henry Tolkmith, Midland, Mich., assignor to The Dow Chemical Company, Midland, Mich., a corporation of Delaware No Drawing. Application December 30, 1950, Serial No. 203,776

1 Claim. (Cl. 260—293.4)

This invention is directed to the O-ethyl S-(ethylxanthoyl) piperidyl thiophosphate of the formula

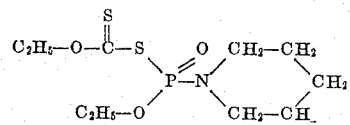

This compound is a viscous oil, somewhat soluble in many organic solvents and substantially insoluble in water. It is of value as an intermediate for the preparation of more complex organic derivatives and as a constituent of parasiticide compositions.

This new compound may be prepared by reacting an alkali metal ethylate with S-(ethylxanthoyl) piperidyl thiophosphoric chloride of the formula

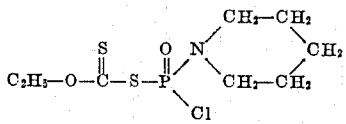

in an inert organic solvent such as benzene. Of the alkali metal ethylates found useful in the reaction, it is preferred to employ the sodium compound. In practice, good results are obtained when substantially equimolecular proportions of the reactants are employed.

In carrying out the reaction, the sodium ethylate is added with stirring to the S-(ethylxanthoyl) piperidyl thiophosphoric chloride dispersed in the solvent and the resulting mixture heated for a period of time at a temperature of from 40° to 80° C. In practice, it is sometimes convenient to operate at the boiling temperature of the reaction mixture and under reflux. Temperatures substantially in excess of 80° C. for any appreciable period of time are to be avoided as the desired product has a tendency to decompose at such temperature. If desired, an alcoholic solution of the ethylate may be employed as a starting material. It has been found that the excess alcohol does not interfere with the course of the reaction. Upon completion of the reaction, the crude mixture may be filtered and the filtrate concentrated by distillation under reduced pressure at gradually increasing temperatures up to a temperature of 80° C. to separate low boiling constituents and to obtain as a residue the desired O-ethyl S-(ethylxanthoyl) piperidyl thiophosphate.

The S-(ethylxanthoyl) piperidyl thiophosphoric chloride employed as a starting material in the above-described method may be prepared by reacting one molecular proportion of sodium ethylxanthate with one molecular proportion of piperidyl phosphoric dichloride in an inert organic solvent such as benzene. In carrying out the reaction, the reactants and solvent are mixed together and the resulting mixture heated with stirring for a period of time at a temperature of from 40° to 80° C. To avoid decomposition, temperatures substantially in excess of 80° C. should not be employed. Upon completion of the reaction, the mixture may be filtered and the filtrate concentrated by distillation under reduced pressure to a temperature up to 80° C. to obtain as a residue S-(ethylxanthoyl) piperidyl thiophosphoric chloride. This compound is an oily liquid having a density of 1.230 at 18° C. The latter compound and the described method for its production constitute the subject matter of my copending application Serial No. 203,765, filed concurrently herewith.

In a representative preparation, an alcoholic solution of 2.5 grams (0.036 mole) of sodium ethylate in 11 milliliters of ethanol was added with stirring to 10 grams (0.034 mole) of S-(ethylxanthoyl) piperidyl thiophosphoric chloride dispersed in 40 milliliters of benzene and the resulting mixture heated for 2 hours at the boiling temperature and under reflux. The mixture was then filtered and the filtrate concentrated by distillation under reduced pressure at gradually increasing temperatures up to 80° C. to obtain as a residue an O-ethyl S-(ethylxanthoyl) piperidyl thiophosphate product. The latter is a viscous oil having a density of 1.096 at 20° C.

I claim:

O-ethyl S-(ethylxanthoyl) piperidyl thiophosphate.

HENRY TOLKMITH.

No references cited.